(12) United States Patent  (10) Patent No.: US 7,499,777 B2
Grichnik et al.  (45) Date of Patent: Mar. 3, 2009

(54) DIAGNOSTIC AND PROGNOSTIC METHOD AND SYSTEM

(75) Inventors: Anthony J. Grichnik, Peoria, IL (US); Michael Seskin, Cardiff, CA (US); Wade Willden, Oceanside, CA (US)

(73) Assignee: Caterpillar Inc., Peoria, IL (US)

( * ) Notice: Subject to any disclaimer, the term of this patent is extended or adjusted under 35 U.S.C. 154(b) by 550 days.

(21) Appl. No.: 11/101,544

(22) Filed: Apr. 8, 2005

(65) Prior Publication Data

US 2006/0230313 A1  Oct. 12, 2006

(51) Int. Cl.
 *G06F 7/00* (2006.01)
(52) U.S. Cl. ........................................................ 701/29
(58) Field of Classification Search ................... 701/29, 701/33–34; 714/25–26; 702/182–185
 See application file for complete search history.

(56) References Cited

U.S. PATENT DOCUMENTS

| | | | |
|---|---|---|---|
| 5,561,610 A | 10/1996 | Schricker et al. | |
| 5,566,091 A | 10/1996 | Schricker et al. | |
| 5,604,306 A | 2/1997 | Schricker | |
| 5,682,317 A | 10/1997 | Keeler et al. | |
| 5,750,887 A | 5/1998 | Schricker | |
| 5,842,202 A | 11/1998 | Kon | |
| 5,914,890 A | 6/1999 | Sarangapani et al. | |
| 5,950,147 A | 9/1999 | Sarangapani et al. | |
| 5,966,312 A | 10/1999 | Chen | |
| 5,987,976 A | 11/1999 | Sarangapani | |
| 6,086,617 A | 7/2000 | Waldon et al. | |
| 6,119,074 A | 9/2000 | Sarangapani | |
| 6,199,007 B1 | 3/2001 | Zavarehi et al. | |
| 6,240,343 B1 | 5/2001 | Sarangapani et al. | |
| 6,442,511 B1 | 8/2002 | Sarangapani et al. | |
| 6,785,604 B2 | 8/2004 | Jacobson | |
| 6,823,675 B2 | 11/2004 | Brunell et al. | |

(Continued)

FOREIGN PATENT DOCUMENTS

EP 1103926 5/2001

(Continued)

OTHER PUBLICATIONS

Hughes et al. "Linear Statistics for Zeros of Riemann's Zeta Function" C.R. Acad. Sci. Paris, Ser. I335 (2002) 667-670-XP004388559.

(Continued)

*Primary Examiner*—Yonel Beaulieu
(74) *Attorney, Agent, or Firm*—Finnegan, Henderson, Farabow, Garrett & Dunner

(57) ABSTRACT

A method for diagnosing a system is provided. The method may include obtaining a plurality of input parameters from the system. The system may generate actual values of one or more output parameters based on the plurality of input parameters. The method may also include independently deriving values of the one or more output parameters, based on the plurality of input parameters, using a computational model, and detecting a divergence between the derived values and the actual values. Further, the method may include identifying respective desired statistic distributions of the plurality of input parameters, based on the actual values of the one or more output parameters, using the computational model.

14 Claims, 6 Drawing Sheets

U.S. PATENT DOCUMENTS

| | | | |
|---|---|---|---|
| 6,975,962 B2 * | 12/2005 | Wegerich et al. | 702/182 |
| 7,027,953 B2 * | 4/2006 | Klein | 702/184 |
| 2003/0055607 A1 | 3/2003 | Wegerich et al. | |
| 2005/0055176 A1 | 3/2005 | Clarke et al. | |

FOREIGN PATENT DOCUMENTS

| | | |
|---|---|---|
| EP | 1418481 | 5/2004 |
| JP | 10-332621 | 12/1998 |
| WO | WO 02/057856 | 7/2002 |

OTHER PUBLICATIONS

Genichi Taguchi, Rajesh Jugulum, The Mahalanobis Taguchi Strategy, A Pattern Technology System, John Wiley & Sons, Inc.; 2002.

G. Galperin, G. Tesauro, Parallel Monte-Carlo Simulation of Neural Network Controllers, available at http://www-fp.mcs.anl.gov/ccst/research/reports_pre1998/neural_network/galperin.html, printed on Mar. 11, 2005.

Concurrently filed US nonprovisional application entitled "Probabilistic Modeling System for Product Design," by Michael Seskin et al., no date.

Concurrently filed US nonprovisional application entitled "Mahalanobis Distance Genetic Algorithm (MDGA) Method and System," by Anthony Grichnik et al., no date.

Concurrently filed US nonprovisional application entitled "Zeta Statistic Process Method and System," by Anthony Grichnik et al., no date.

Concurrently filed US nonprovisional application entitled "Control System and Method," by Anthony Grichnik et al., no date.

Concurrently filed US nonprovisional application entitled "Process Model Monitoring Method and System," by Anthony Grichnik et al., no date.

U.S. Appl. No. 10/327,676 entitled "Methods and Systems for Modifying Flash Files," by Anthony Grichnik, filed Dec. 24, 2002.

SID Sytsma, Quality and Statistical Process Control, available at http://www.sytsma.com/tqmtools/ctlchtprinciples.html, printed on Apr. 7, 2005.

* cited by examiner

DIAGNOSTIC AND PROGNOSTIC METHOD AND SYSTEM

TECHNICAL FIELD

This disclosure relates generally to diagnostic and prognostic systems and, more particularly, to mathematical model based diagnostic and prognostic systems.

BACKGROUND

Modern work machines often are equipped with complex control systems to support a wide range of operations. The operational conditions of these complex systems, such as an engine control system, may need to be monitored in order to diagnose and/or predict certain failures of the systems. A wide variety of techniques and apparatus have been developed for diagnosing engines and engine control systems, including expert systems, fuzzy logic based systems, and neural network models. These techniques and apparatus may be used for diagnostic and/or prognostic purposes. A diagnostic system may be used to identify a root source of a failure after the failure has occurred, and a prognostic system may be used to identify a root source of a failure before the failure has occurred.

Some of these conventional techniques operate only to classify operation conditions into two categories, normal or abnormal, without offering further analysis to identify possible causes for failures. Other conventional techniques, such as described in U.S. Pat. No. 6,240,343 B1 issued to Sarangapani et al. on May 29, 2001, use differences between actual values from an engine and model values from a process model as ordinary inputs to the process model to generate output patterns of failures based on prior knowledge of the system. However, such techniques may require a large amount of computational time and may fail to identify particular causes of failures, such as failures associated with particular inputs and their control logics.

Methods and systems consistent with certain features of the disclosed systems are directed to solving one or more of the problems set forth above.

SUMMARY OF THE INVENTION

One aspect of the present disclosure includes a method for diagnosing a system. The method may include obtaining a plurality of input parameters from the system. The system may generate actual values of one or more output parameters based on the plurality of input parameters. The method may also include independently deriving values of the one or more output parameters, based on the plurality of input parameters, using a computational model, and detecting a divergence between the derived values and the actual values. Further, the method may include identifying respective desired statistic distributions of the plurality of input parameters, based on the actual values of the one or more output parameters, using the computational model.

Another aspect of the present disclosure includes a method for providing a prognosis associated with a system. The method may include obtaining a plurality of input parameters from the system. The system under diagnose may generate actual values of one or more output parameters based on the plurality of input parameters. The method may also include independently deriving values of the one or more output parameters using a computational model based on the plurality of input parameters, and estimating future values of the one or more output parameters of the system by calculating a trend of differences between the actual values and the derived values. Further, the method may include detecting a potential divergence between the future values and the derived values, and identifying respective desired statistic distributions of the plurality of input parameters using the computational model based on the future values of the one or more output parameters.

Another aspect of the present disclosure includes a diagnostic and prognostic system. The diagnostic and prognostic system may include a plurality of input elements configured to accept a respective plurality of input parameters from a system being diagnosed, and one or more output elements configured to accept respective one or more output parameters. The diagnostic and prognostic system may also include a processor. The processor may be configured to diagnose and predict a failure associated with any of the plurality of input parameters based on a diagnostic model. The diagnostic model may be created by obtaining data records associating the plurality of input parameters and the one or more output parameters, and generating a computational model indicative of interrelationships between the plurality of input parameters and the one or more output parameters based on the data records. The model may be created further by determining original desired respective statistical distributions of the plurality of input parameters of the computational model based on a zeta statistic of the computational model.

Another aspect of the present disclosure includes a work machine. The work machine may include an engine and an electronic control module configured to control operation of the engine by using actual values of one or more output parameters based on a plurality of input parameters. The work machine may also include a diagnostic and prognostic system. The diagnostic and prognostic system may include a processor, which may be configured to obtain the plurality of input parameters and derive values of the one or more output parameters based on the plurality of input parameters using a computational model indicative of interrelationships between the plurality of input parameters and the one or more output parameters. The processor may be further configured to identify a potential failure associated with any of the plurality of input parameters based on a zeta statistic of the computational model.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
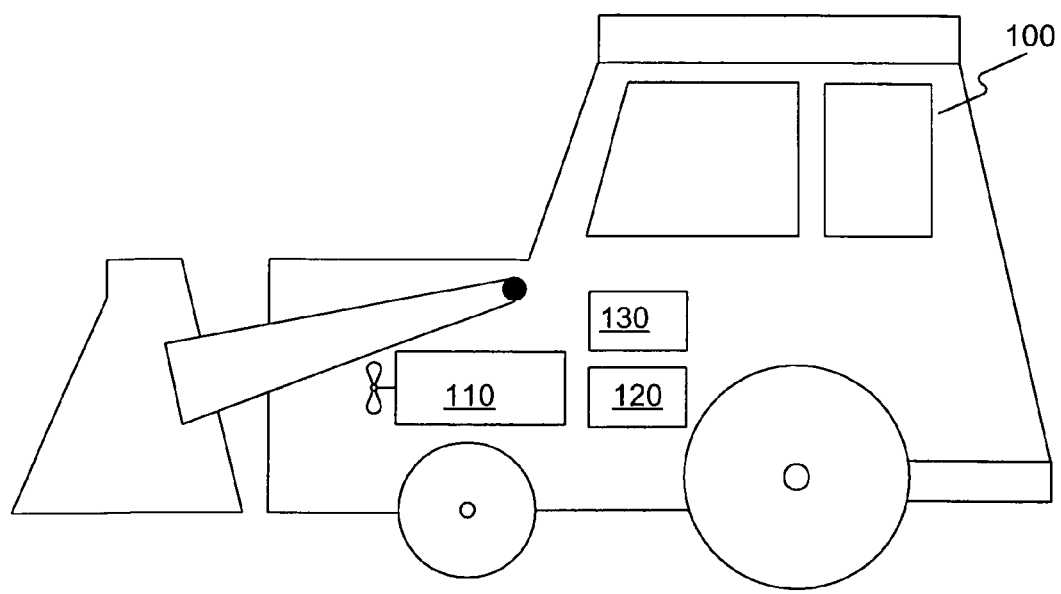
FIG. 1 is a pictorial illustration of an exemplary work machine that may incorporate certain disclosed embodiments.

FIG. 1 illustrates an exemplary work machine 100 in which features and principles consistent with certain disclosed embodiments may be incorporated. Work machine 100 may refer to any type of fixed or mobile machine that performs some type of operation associated with a particular industry, such as mining, construction, farming, transportation, etc. and operates between or within work environments (e.g., construction sites, mining sites, power plants and generators, roadways, etc.). Non-limiting examples of mobile machines include commercial machines, such as trucks, cranes, earth moving vehicles, mining vehicles, backhoes, material handling equipment, farming equipment, marine vessels, aircraft, power generators, manufacturing machinery, and any type of movable machine that operates in a work environment. Although, as shown in FIG. 1, work machine 100 is an earth handling type work machine, it is contemplated that work machine 100 may be any type of work machine. Further, work machine 100 may be conventionally powered, hybrid electric, and/or fuel cell powered.

As shown in FIG. 1, work machine 100 may include an engine 110, an electronic control module (ECM) 120, and a diagnostic and prognostic system 130. Engine 110 may include any appropriate type of engine that generates power for work machine 100, such as an internal combustion engine. ECM 120 may include any appropriate type of control system configured to perform engine control functions and/or any other work machine control functions. Diagnostic and prognostic system 130 may include any appropriate type of control system configured to perform engine diagnostic and prognostic functions. In certain embodiments, diagnostic and prognostic system 130 may coincide with ECM 120. Although diagnostic and prognostic system 130 is shown configured with engine 110, diagnostic and prognostic system 130 may be configured to perform diagnostic and prognostic functions for other systems on work machine 100, such as transmission systems, and/or hydraulics systems, etc.

Figure 2:
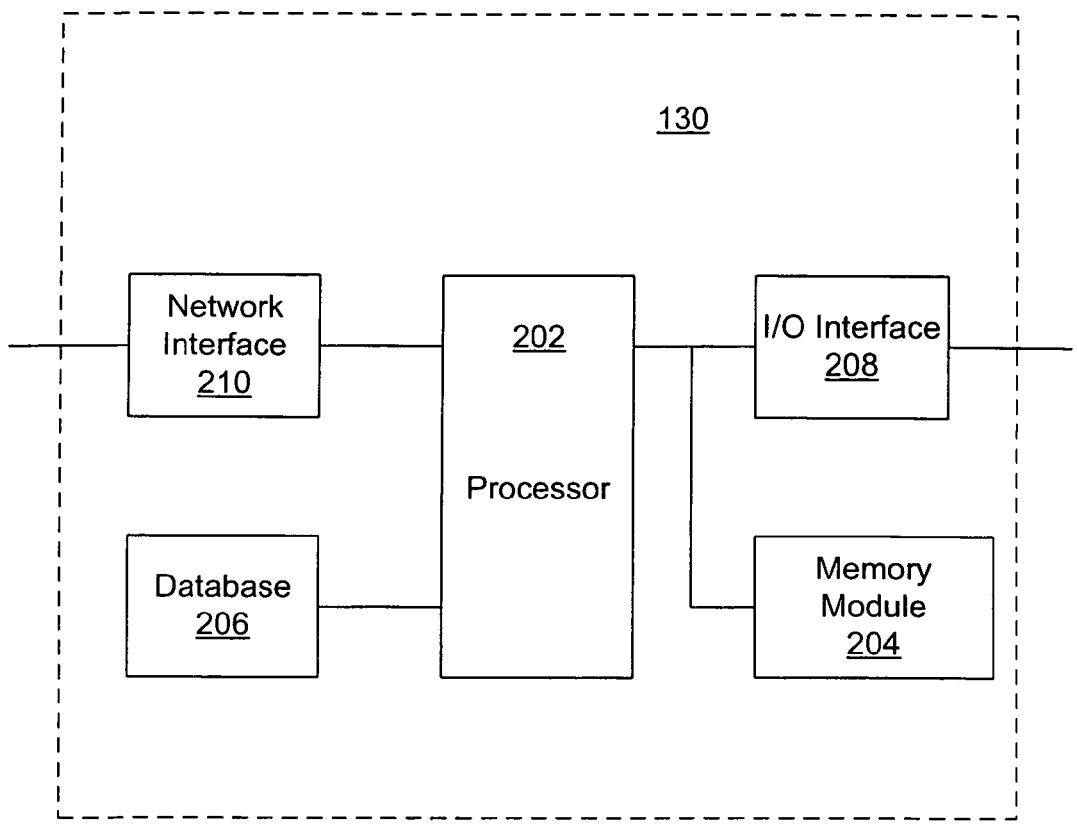
FIG. 2 illustrates a functional block diagram of an exemplary diagnostic and prognostic system.

FIG. 2 shows an exemplary functional block diagram of diagnostic and prognostic system 130. As shown in FIG. 2, diagnostic and prognostic system 130 may include a processor 202, a memory module 204, a database 206, an I/O interface 208, and a network interface 210. It is understood that other components may also be included in diagnostic and prognostic system 130.

Processor 202 may include any appropriate type of general purpose microprocessor, digital signal processor or microcontroller. Processor 202 may be configured as a separate processor module dedicated to controlling engine 110. Alternatively, processor 202 may be configured as a shared processor module for performing other functions.

Memory module 204 may include one or more memory devices including, but not limited to, a ROM, a flash memory, a dynamic RAM, and a static RAM. Memory module 204 may be configured to store information used by processor 202. Database 206 may include any type of appropriate database containing information on characteristics of input parameters, output parameters, mathematical models, and/or any other control information. Further, I/O interface 206 may be used to connect various sensors or other components (not shown) to processor 202 for monitoring and controlling operations of engine 110. Network interface 210 may include any appropriate type of network adaptor capable of communicating with other computer systems based on one or more communication protocols.

Figure 3:
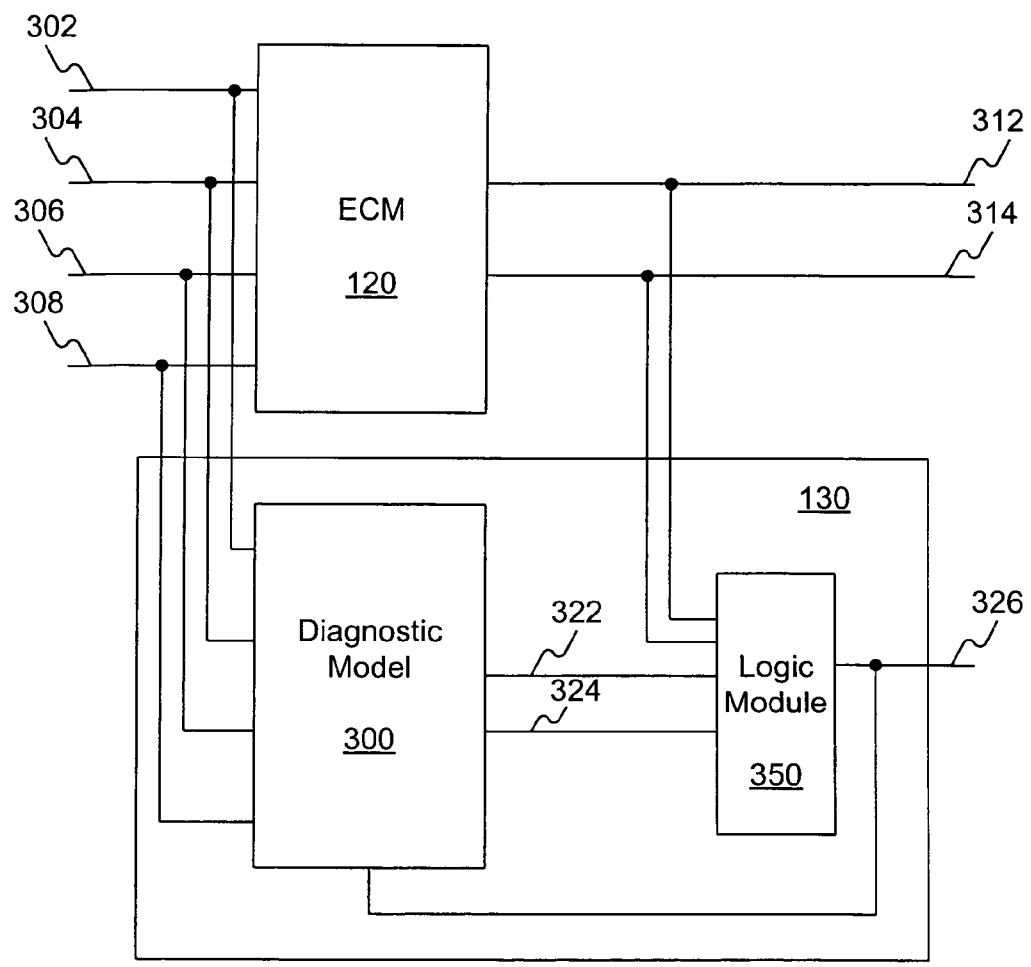
FIG. 3 illustrates a block diagram of an operational environment of an exemplary diagnostic and prognostic system.

ECM 120 and diagnostic-and-prognostic system 130 may work together during operation of work machine 100, as shown in FIG. 3. ECM 120 may have a plurality of input parameters and output parameters. For example, ECM 120 may include input parameters 302 304, 306, and 308. Input parameter 302 may correspond to a gas pedal indication, input parameter 304 may correspond to a gear selection, input parameter 306 may correspond to atmospheric pressure, and input parameter 308 may correspond to engine temperature. ECM 120 may also include output parameters 312 and 314. Output parameter 312 may correspond to a throttle valve setting, and output parameter 314 may correspond to boost control. Although only four input parameters and two output parameters are shown in FIG. 3, any number of input and output parameters may be used. In operation, once provided with values of the input parameters, ECM 120 may generate values for the output parameters using internal control logic and predetermined algorithms. ECM 120 may then use the values of the output parameters to control engine 110.

Diagnostic and prognostic system 130 may monitor operation of ECM 120 to diagnose and/or predict failures during operation of engine 110. Diagnostic and prognostic system 130 may include a diagnostic model 300 and a logic module 350. Diagnostic model 300 may reflect relationships between input parameters and output parameters of ECM 120. Diagnostic model 300 may accept the same plurality of input parameters as ECM 120 and may independently derive values of the output parameters.

Diagnostic model 300 may use all of the plurality of input parameters or a subset of the plurality of input parameters based on certain algorithms explained below. The output parameters of diagnostic model 300 may include the same output parameters as ECM 120. For example, diagnostic model 300 may include the same input parameters 302, 304, 306, and 308. Diagnostic model 300 may also include output parameters 322 and 324, which may correspond to output parameters 312 and 314, respectively. Alternatively, diagnostic model 300 may include only those output parameters required for diagnostic purposes. In operation, diagnostic model 300 may receive real-time values of input parameters 302 to 308 and derive values for output parameters 322 and 324 for diagnostic and prognostic purposes. Diagnostic model 300 may be generated and optimized according to a process shown in FIG. 4.

Figure 4:
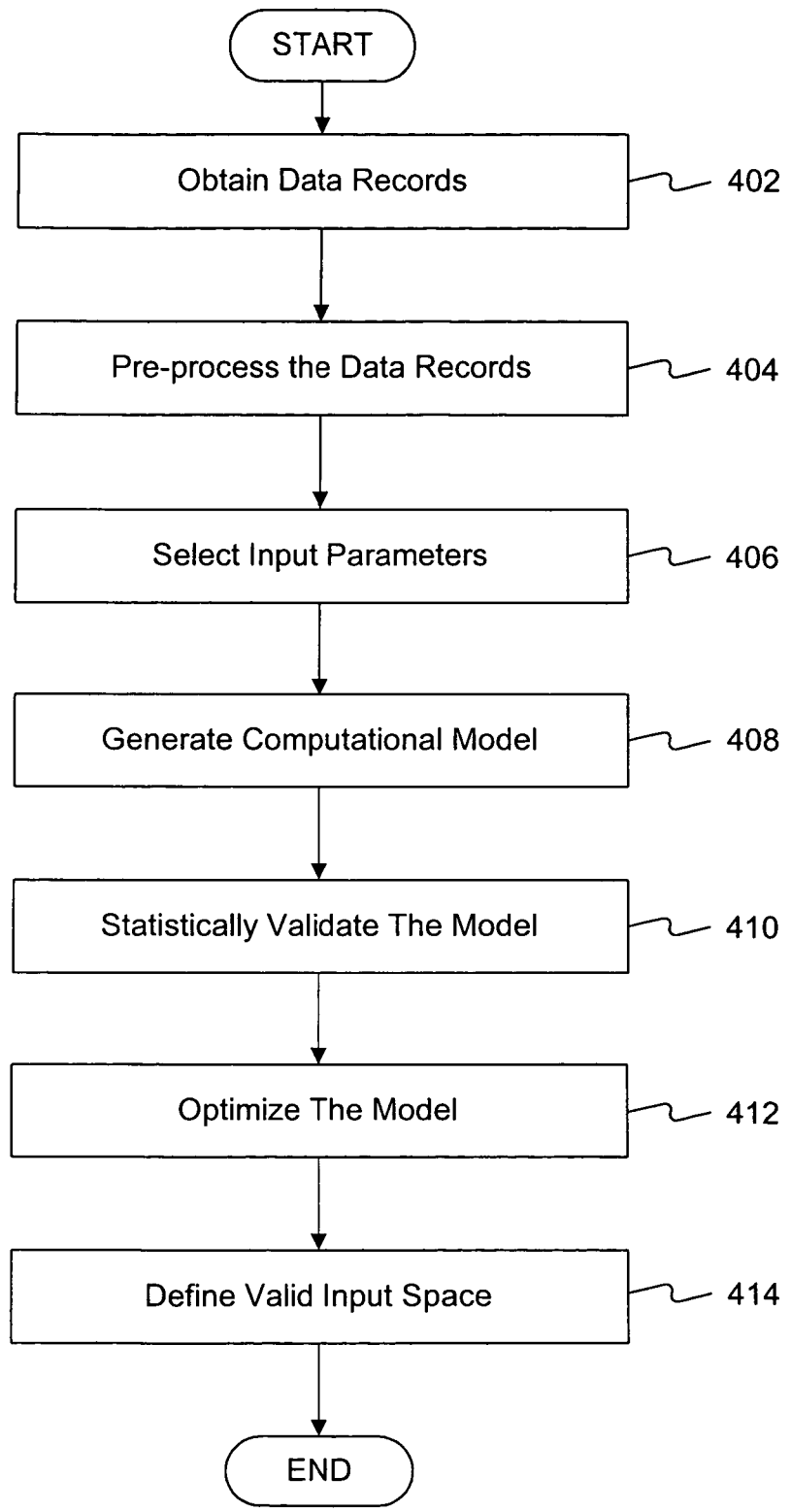
FIG. 4 illustrates an exemplary model generation and optimization process consistent with disclosed embodiments.

FIG. 4 shows an exemplary model generation and optimization process performed by diagnostic and prognostic system 130 and, more specifically, by processor 202. Alternatively, the process may also be performed by an external computer system (e.g., any appropriate type of computer system), and the generated models may then be loaded into diagnostic and prognostic system 130. When an external computer system is used to generate and optimize the models, processor 202 may refer to a central processing unit (CPU) of the external computer system configured to perform such processes.

At the beginning of the model generation and optimization process, processor 202 may obtain data records associated with the input parameters and the output parameters (step 402). The data records may be previously collected during a certain time period from a test engine and its electronic control module or from electronic control modules of a plurality of work machines and engines. The data records may also be collected from experiments designed for collecting such data. Alternatively, the data records may be generated artificially by other related processes, such as a design process. The data records may reflect characteristics of the input parameters and the output parameters, such as statistic distributions, normal ranges, and/or tolerances, etc.

Once the data records are obtained (step 402), processor 202 may pre-process the data records to clean up the data records for obvious errors and to eliminate redundancies (step 404). Processor 202 may remove approximately identical data records and/or remove data records that are out of a reasonable range in order to be meaningful for model generation and optimization. After the data records have been preprocessed, processor 202 may then select proper input parameters by analyzing the data records (step 406).

The data records may include many input variables. The number of input variables may be greater than the number of the input parameters or variables used for diagnostic model 300. For example, in addition to values corresponding to input parameters or variables of gas pedal indication, gear selection, atmospheric pressure, and engine temperature, the data records may also include input variables such as fuel indication, tracking control indication, and/or other engine parameters.

In certain situations, the number of input variables may exceed the number of the data records and lead to sparse data scenarios. Some of the extra input variables may be omitted in certain mathematical models. The number of the input variables may need to be reduced to create mathematical models within practical computational time limits:

Processor 202 may select input parameters according to predetermined criteria. For example, processor 202 may choose input parameters by experimentation and/or expert opinions. Alternatively, in certain embodiments, processor 202 may select input parameters based on a mahalanobis distance between a normal data set and an abnormal data set of the data records. The normal data set and abnormal data set may be defined by processor 202 by any appropriate method. For example, the normal data set may include characteristic data associated with the input parameters that produce desired output parameters. On the other hand, the abnormal data set may include any characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that mahalanobis distance takes into account the correlations of the data set. Mahalanobis distance of a data set X (e.g., a multivariate vector) may be represented as:

$$MD_i = (X_i - \mu_x)\Sigma^{-1}(X_i - \mu_x)' \quad (1)$$

where $\mu_x$ is the mean of X and $\Sigma^-$ is an inverse variance-covariance matrix of X. $MD_i$ weights the distance of a data point $X_i$ from its mean $\mu_x$ such that observations that are on the same multivariate normal density contour will have the same distance. Such observations may be used to identify and select correlated parameters from separate data groups having different variances.

Processor 202 may select a desired subset of input parameters such that the mahalanobis distance between the normal data set and the abnormal data set is maximized or optimized. A genetic algorithm may be used by processor 202 to search the input parameters for the desired subset with the purpose of maximizing the mahalanobis distance. Processor 202 may select a candidate subset of the input parameters based on a predetermined criteria and calculate a mahalanobis distance $MD_{normal}$ of the normal data set and a mahalanobis distance $MD_{abnormal}$ of the abnormal data set. Processor 202 may also calculate the mahalanobis distance between the normal data set and the abnormal data using the relationship $MD_x = MD_{normal} - MD_{abnormal}$. Other types of deviations, however, may also be used.

Processor 202 may select the candidate subset of the input parameters if the genetic algorithm converges (i.e., the genetic algorithm finds the maximized or optimized mahalanobis distance between the normal data set and the abnormal data set corresponding to the candidate subset). If the genetic algorithm does not converge, a different candidate subset of the input parameters may be created for further searching. This searching process may continue until the genetic algorithm converges and a desired subset of the input parameters is selected.

After selecting input parameters (e.g., gas pedal indication, gear selection, atmospheric pressure, and temperature, etc.), processor 202 may generate a computational model (e.g., diagnostic model 300) to build interrelationships between input parameters and output parameters (step 408). Any appropriate type of neural network may be used to build the computational model. The type of neural network models used may include back propagation, feed forward models, cascaded neural networks, and/or hybrid neural networks, etc. Particular types or structures of the neural network used may depend on particular applications. Other types of models, such as linear system or non-linear system models, etc., may also be used.

The neural network computational model may be trained by using selected data records. For example, the neural network computational model may include a relationship between output parameters (e.g., boost control, throttle valve setting, etc.) and input parameters (e.g., gas pedal indication, gear selection, atmospheric pressure, and engine temperature, etc). The neural network computational model may be evaluated by predetermined criteria to determine whether the training is completed. For example, the criteria may include desired ranges of accuracy, time, and/or number of training iterations, etc.

After the neural network has been trained such that the computational model has initially been established based on the predetermined criteria, processor 202 may statistically validate the computational model (step 410). Statistical validation may refer to an analyzing process to compare outputs of the neural network computational model with actual outputs to determine the accuracy of the computational model. Part of the data records may be reserved for use in the validation process. Alternatively, processor 202 may also generate simulation or test data for use in the validation process.

Once trained and validated, the computational model may be used to determine values of the output parameters when provided with values of the input parameters. For example, processor 202 may use the computation model to determine throttle valve setting and boost control based on input values of gas pedal indication, gear selection, atmospheric pressure, and engine temperature, etc. The values of the output parameters may then be used to control hardware devices of diagnostic and prognostic system 130 or engine 110. Further, processor 202 may optimize the model by determining desired distributions of the input parameters based on relationships between the input parameters and desired distributions of the output parameters (step 412).

Processor 202 may analyze the relationships between desired distributions of the input parameters and desired distributions of the output parameters based on particular applications. For example, if a particular application requires a higher fuel efficiency, processor 202 may use a small range for the throttle valve setting and use a large range for the boost control. Processor 202 may then run a simulation of the computational model to find a desired statistical distribution for an individual input parameter (e.g., gas pedal indication, gear selection, atmospheric pressure, or engine temperature, etc). That is, processor 202 may separately determine a distribution (e.g., mean, standard variation, etc.) of the individual input parameter corresponding to the normal ranges of the output parameters. Processor 202 may then analyze and combine the separately obtained desired distributions for all the individual input parameters to determined concurrent desired distributions and characteristics for the input parameters. The concurrent desired distribution may be different from separately obtained distributions.

Alternatively and preferably, processor 202 may identify desired distributions of input parameters simultaneously to maximize the probability of obtaining desired outcomes. In certain embodiments, processor 202 may simultaneously determine desired distributions of the input parameters based on zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

where $\bar{x}_i$ represents the mean or expected value of an ith input; $\bar{x}_j$ represents the mean or expected value of a jth outcome; $\sigma_i$ represents the standard deviation of the ith input; a represents the standard deviation of the jth outcome; and $|S_{ij}|$ represents the partial derivative or sensitivity of the jth outcome to the ith input.

Processor 202 may identify a desired distribution of the input parameters such that the zeta statistic of the neural network computational model (i.e., diagnostic model 300) is maximized or optimized. An appropriate type of genetic algorithm may be used by processor 202 to search the desired distribution of input parameters with the purpose of maximizing the zeta statistic. Processor 202 may select a candidate set of input parameters with predetermined search ranges and run a simulation of the diagnostic model to calculate the zeta statistic parameters based on the input parameters, the output parameters, and the neural network computational model. Processor 202 may obtain $\bar{x}_i$ and $\sigma_i$ by analyzing the candidate set of input parameters and obtain $\bar{x}_j$ and $\sigma_j$ by analyzing the outcomes of the simulation. Further, processor 202 may obtain $|S_{ij}|$ from the trained neural network as an indication of the impact of ith input on the jth outcome.

Processor 202 may select the candidate set of input parameters if the genetic algorithm converges (i.e., the genetic algorithm finds the maximized or optimized zeta statistic of diagnostic model 300 corresponding to the candidate set of input parameters). If the genetic algorithm does not converge, a different candidate set of input parameters may be created by the genetic algorithm for further searching. This searching process may continue until the genetic algorithm converges and a desired set of the input parameters is identified. Processor 202 may further determine desired distributions (e.g., mean and standard deviations) of input parameters based on the desired input parameter set. Once the desired distributions are determined, processor 202 may also define a valid input space which may include any input parameter within the desired distributions (step 414).

In one embodiment, statistical distributions of certain input parameters may be impossible or impractical to be controlled. For example, an input parameter may be associated with a physical attribute of a device that is constant, or the input parameter may be associated with a constant variable within a process model. These input parameter may be used in the zeta statistic calculations to search or identify desired distributions for other input parameters corresponding to constant values and/or statistical distributions of these input parameters.

Figure 5:
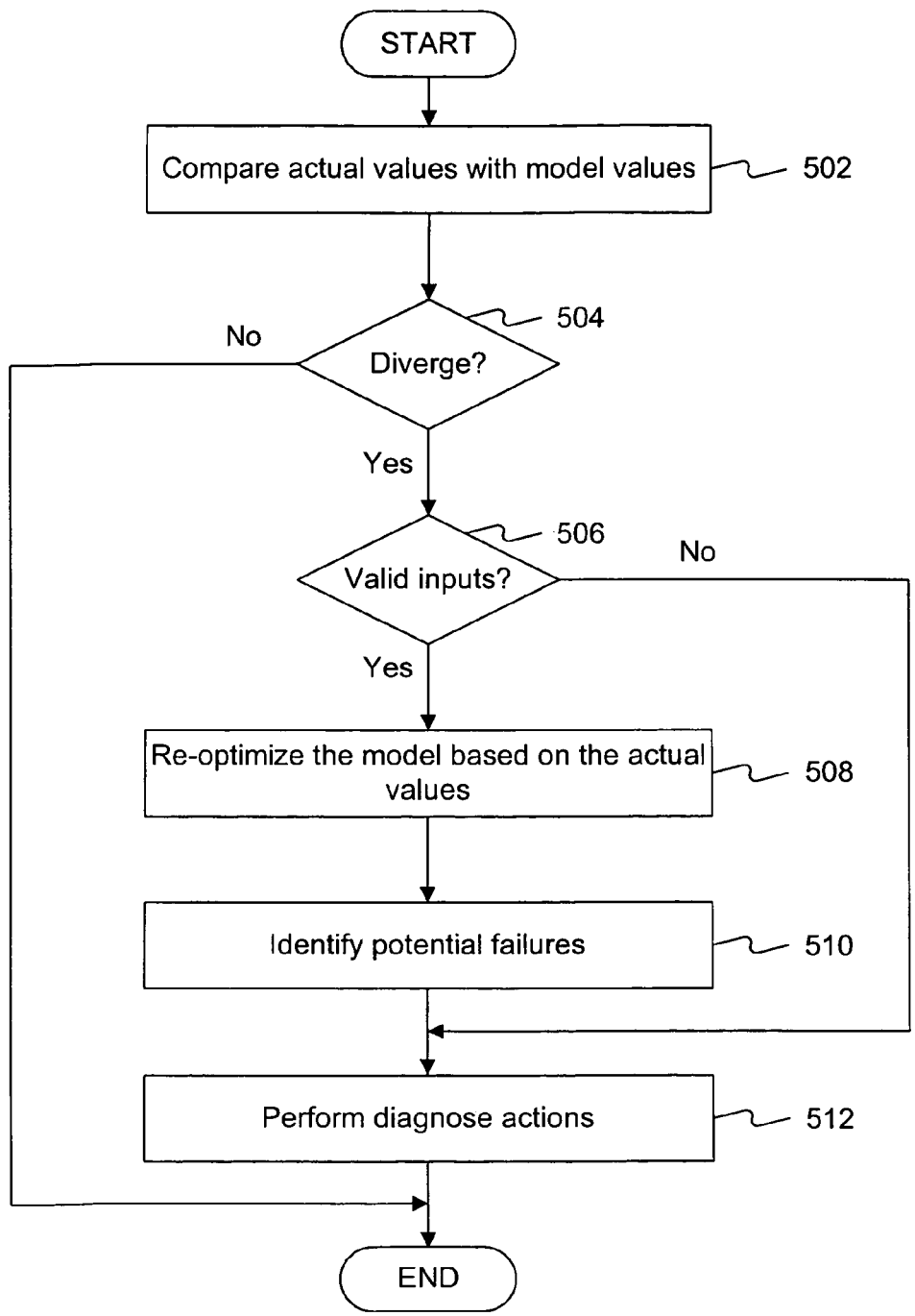
FIG. 5 illustrates an exemplary diagnostic process consistent with disclosed embodiments.

Returning to FIG. 3, the generated and optimized computational model (i.e., diagnostic model 300) may be used in diagnostic and/or prognostic operation. Processor 202 may use logic module 350 to determine deviations between actual values of the output parameters of ECM 120 (e.g., output parameters 312 and 314) and values of output parameters of diagnostic model 300 (e.g., output parameters 322 and 324). Processor 202 may diagnose a failure of engine 110 or ECM 120 based on the determined deviations. Logic module 350 may include any appropriate type of computer hardware component or software program configured to determine diagnostic actions need to be performed. A diagnostic output 326 may also be provided to notify and/or display results of a diagnostic process and/or a prognostic process as explained below. FIG. 5 illustrates an exemplary diagnostic process performed by processor 202.

As shown in FIG. 5, processor 202 may compare actual values of output parameters of ECM 120 (e.g., output parameters 312 and 314) with respective derived values of output parameters of diagnostic model 300 (e.g., output parameters 322 and 324) (step 502). Processor 202 may then determine whether the actual values diverge with the derived values (step 504). To determine whether there is a divergence between an actual value of an output parameter of ECM 120 and a derived value of a corresponding output parameter of diagnostic and prognostic system 130, processor 202 may determine a difference between the actual value and the derived value. Processor 202 may compare the difference with a predetermined threshold. If the difference is beyond the threshold, processor 202 may determine that the actual value diverges from the derived value (step 504; yes).

On the other hand, if the difference is below the threshold, processor 202 may determine that actual value does not diverge from the derived value (step 504; no). Processor 202 may then complete the diagnostic process. If processor 202 determines a divergence (step 504; yes), processor 202 may further determine whether the input parameters are valid (step 506).

As explained above, diagnostic model 300 may have a valid input space optimized for the input parameters. If processor 202 determines that a value of an input parameter (e.g., any of input parameters 302, 304, 306, or 308) is outside the input space (i.e., outside the range of a desired distribution of the input parameter), processor 202 may determine that the input parameter has an invalid value (step 506; no). Because diagnostic model 300 may be generated and optimized to be operated based on the input space, processor 202 may determine that the derived value may be inconclusive on identifying causes of particular failures. The diagnostic process may then go to step 512 to indicate such inconclusiveness.

If processor 202 does not find any invalid input parameter values (step 506; yes), processor 202 may further identify potential factors causing the divergence between the actual values and the derived values. Processor 202 may use the actual values of the output parameters of ECM 120 to re-optimize diagnostic model 300 to identify desired distributions of the input parameters corresponding to the actual output parameter values (step 508). That is, processor 202 may re-optimize diagnostic model 300 based on the actual output parameter values using steps described above with respect to step 412 of FIG. 4.

After identifying the desired distributions of the input parameters based on the actual output parameter values from ECM 120 (step 508), processor 202 may use the original desired distributions of the input parameters and the recalculated desired distributions to identify potential failures (step 510). Processor 202 may compare the original desired distributions with respective recalculated distributions. If the difference between an original desired distribution of a particular input parameter and a recalculated distribution of the particular input parameter is above a predetermined threshold, processor 202 may determine that certain hardware devices and/or software programs associated with the particular input parameter may potentially have failed.

Processor 202 may further perform any appropriate diagnostic actions (step 512). For example, processor 202 may send out alarms via diagnostic output 326 to an operator of work machine 100. Processor 202 may also display information on possible failure conditions or failed devices to the operator. Alternatively, processor 202 may further control other work machine components to correct or remedy determined failure conditions.

Figure 6:
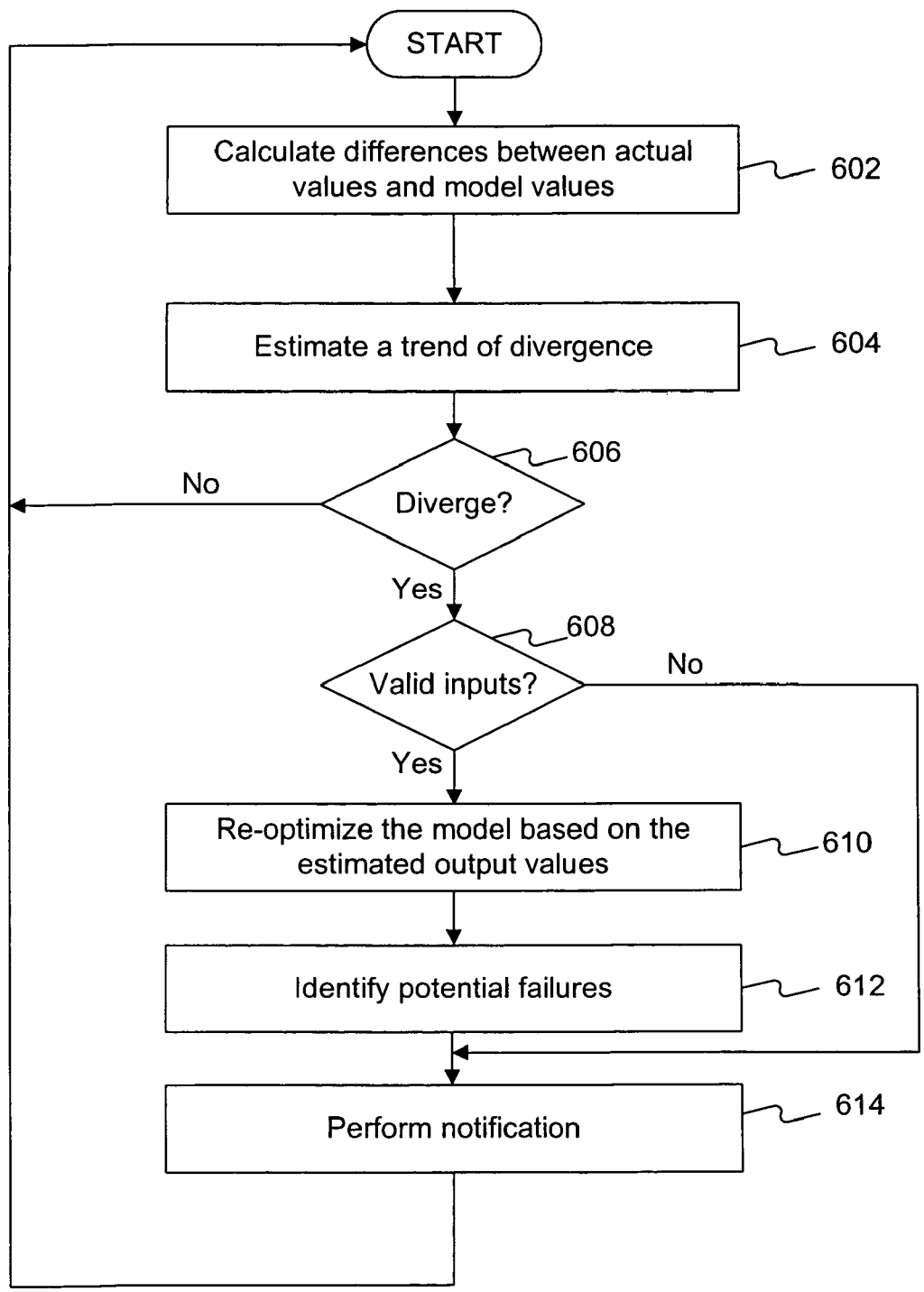
FIG. 6 illustrates an exemplary prognostic process consistent with disclosed embodiments.

In addition to the diagnostic process, processor 202 may also perform prognostics to predict failure conditions or failing devices without an occurrence of an actual divergence. FIG. 6 shows an exemplary prognostic process performed by processor 202.

As shown in FIG. 6, after every predetermined period of time, processor 202 may calculate differences between actual values of the output parameters of ECM 120 and derived values of the output parameters of diagnostic model 300 (step 602). A divergence may be calculated based on the differences between the actual values and the derived values and/or based on a difference between an actual value of a particular output parameter and a corresponding derived value of the particular output parameter. Processor 202 may estimate a trend of the divergence (step 604). Any appropriate type of algorithm may be used to estimate the trend. After estimating the trend, processor 202 may determine whether there will be a divergence between future values of the output parameters of ECM 120 and the derived values of the output parameters of diagnostic model 300 (step 606).

If processor 202 determines that there will not be a divergence (step 606; no), processor 202 may store the current differences and continue to monitor values of the output parameters for the next period of time. On the other hand, if the trend of the differences is beyond a predetermined threshold, processor 202 may determine that the future values will diverge from the derived values after a certain amount of time (step 606; yes).

If processor 202 determines a divergence (step 606; yes), processor 202 may further determine whether current input parameters are valid (step 608). Similar to the diagnostic process, if processor 202 determines that a value of an input parameter (e.g., input parameters 302, 304, 306, or 308) is outside the valid input space, processor 202 may determine that the input parameter has an invalid value (step 608; no). Processor 202 may further determine that the trend of the differences may be inconclusive on identifying potential failures associated with the input parameters. The diagnostic process may then goes to step 614 to notify such conditions.

If processor 202 does not find any invalid input parameter values (step 608; yes), processor 202 may, similar to the diagnostic process, identify potential factors causing the divergence by re-optimizing diagnostic model 300 (step 610). Processor 202 may estimate future values of the output parameters of ECM 120 based on the trend of the differences between the actual values and the derived values. Processor 202 may re-optimize or re-target diagnostic model 300 based on the estimated future values of the output parameters using steps described with respect to step 412 of FIG. 4.

After re-optimization, processor 202 may identify desired distributions of the input parameters based on the estimated future output parameter values. Processor 202 may use the original desired distributions of the input parameters and the newly identified distributions to determine potential failures (step 612). Processor 202 may compare the original desired distributions with respective newly identified distributions. If the difference between an original desired distribution of a particular input parameter and a newly identified distribution of the particular input parameter is above a predetermined threshold, processor 202 may determine that certain hardware devices and/or software programs associated with the particular input parameter may cause potential failures after a certain amount of time.

Processor 202 may also notify an operator of work machine 100 of results of the prognostic process (step 614). Processor 202 may also notify any other hardware components or application software programs of the results via diagnostic output 326. The notification may include information indicating that certain input parameter values are out of the input space or certain hardware devices or software programs are likely the causes of potential failures.

INDUSTRIAL APPLICABILITY

The disclosed systems and methods may provide an efficient and optimized solution to a broad range of machine-related diagnostic or prognostic applications. Because the disclosed systems and methods create comparative models without prior domain knowledge, speed and scope of the such applications may be improved significantly. The disclosed systems and methods may also provide an adaptive approach to complex diagnostic and prognostic applications, such as applications with competing requirements, or comparative models requiring self validity check.

The disclosed diagnostic model may be used as a diagnostic tool to identify the most probable cause of an unexpected symptom of a complex system or process. By re-optimizing or re-targeting the optimization component of the diagnostic model, the search results of the input space may reveal the most probable root cause. For example, an engine may be suddenly experiencing a lower fuel efficiency than normal and the diagnostic model may used to find the potential cause of the low fuel efficiency. After re-optimizing the diagnostic model, the search results may indicate a shifted range of a valve actuation time, which may be caused by an aging valve. The particular valve may then be identified as the root cause of the lowered fuel efficiency. Without such diagnostic model, it may be very costly or impractical to find the root cause.

The disclosed systems and methods may be used in a wide range of systems, such as engine systems, transmission systems, hydraulics systems, and any other systems of a work machine. The cost for diagnosing and maintaining these systems may be significantly reduced by accurately identifying possible root causes of any symptoms without special knowledge of these systems.

Other embodiments, features, aspects, and principles of the disclosed exemplary systems will be apparent to those skilled in the art and may be implemented in various environments and systems.

What is claimed is:

1. A method for diagnosing a system, comprising:
obtaining a plurality of input parameters from the system, wherein the system generates actual values of one or more output parameters based on the plurality of input parameters;
independently deriving values of the one or more output parameters, based on the plurality of input parameters, using a computational model;
detecting a divergence between the derived values and the actual values;
identifying respective desired statistical distributions of the plurality of input parameters, based on the actual values of the one or more output parameters, using the computational model;
determining whether any of the plurality of input parameters is out of a predetermined input space prior to identifying the respective desired statistical distributions, wherein the input space is determined based on original desired statistical distributions of the plurality of input parameters of the computational model; and
determining the derived values of the one or more output parameters inconclusive for identifying potential failures if any of the plurality of input parameters is out of the input space.

2. The method according to claim 1, further including:
identifying a potential failure associated with one or more of the input parameters by comparing the identified desired statistical distributions with original desired statistical distributions of the plurality of input parameters of the computational model.

3. The method according to claim 2, further including:
performing a predetermined diagnostic action corresponding to the potential failure.

4. The method according to claim 1, wherein the identifying further includes:
determining a candidate set of input parameters with a maximum zeta statistic using a genetic algorithm; and
determining the desired statistical distributions of the plurality of input parameters based on the candidate set, wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input parameter from the plurality of input parameters; $\bar{x}_j$ represents a mean of a jth output parameter from the one or more output parameters; $\sigma_i$ represents a standard deviation of the ith input parameter from the plurality of input parameters; $\sigma_j$ represents a standard deviation of the jth output parameter from the one or more output parameters; and $|S_{ij}|$ represents sensitivity of the jth output parameter to the ith input parameter of the computational model.

5. The method according to claim 1, wherein the computational model is generated by:
obtaining data records associated with the plurality of input parameters and the one or more output parameters;
selecting a subset of input parameters from the plurality of input parameters;
generating the computational model indicative of interrelationships between the subset of the plurality of input parameters and the one or more output parameters based on the data records; and
determining desired respective statistical distributions of the subset of input parameters of the computational model based on a zeta statistic of the computational model.

6. The method according to claim 5, wherein selecting further includes:
pre-processing the data records; and
using a genetic algorithm to select the subset from the plurality of input parameters based on a mahalanobis distance between a normal data set and an abnormal data set of the data records.

7. The method according to claim 5, wherein generating further includes:
creating a neural network computational model;
training the neural network computational model using the data records; and
validating the neural network computation model using the data records.

8. The method according to claim 5, wherein determining further includes:
determining a candidate set of input parameters with a maximum zeta statistic using a genetic algorithm; and
determining the desired statistical distributions of the input parameters based on the candidate set,
wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

9. A method for providing a prognosis associated with a system, comprising:
obtaining a plurality of input parameters from the system, wherein the system generates actual values of one or more output parameters based on the plurality of input parameters;
independently deriving values of the one or more output parameters using a computational model based on the plurality of input parameters;
estimating future values of the one or more output parameters of the system by calculating a trend of differences between the actual values and the derived values;
detecting a potential divergence between the future values and the derived values; and
identifying respective desired statistic distributions of the plurality of input parameters using the computational model based on the future values of the one or more output parameters,
wherein the computational model is generated by:
obtaining data records associated with the plurality of input parameters and the one or more output parameters;
generating the computational model indicative of interrelationships between the plurality of input parameters and the one or more output parameters based on the data records; and
determining original desired respective statistical distributions of the subset of input parameters of the computational model based on a zeta statistic of the computational model.

10. The method according to claim 9, further including:
predicting a potential failure associated with one or more input parameters by comparing the identified desired statistical distributions with original desired statistical distributions of the plurality of input parameters of the computational model.

11. The method according to claim 10, further including:
notifying a user of the system of the potential failure.

12. The method according to claim 9, wherein the identifying further includes:
determining a candidate set of input parameters with a maximum zeta statistic using a genetic algorithm; and
determining the desired statistical distributions of the plurality input parameters based on the candidate set,
wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input parameter from the plurality of input parameters; $\bar{x}_j$ represents a mean of a jth output parameter from the one or more output parameters; $\sigma_i$ represents a standard deviation of the ith input parameter from the plurality of input parameters; $\sigma_j$ represents a standard deviation of the jth output parameter from the one or more output parameters; and $|S_{ij}|$ represents sensitivity of the jth output parameter to the ith input parameter of the computational model.

13. The method according to claim 11, wherein generating further includes:
creating a neural network computational model;
training the neural network computational model using the data records; and
validating the neural network computation model using the data records.

14. The method according to claim 11, wherein determining further includes:
determining a candidate set of input parameters with a maximum zeta statistic using a genetic algorithm; and
determining the desired statistical distributions of the input parameters based on the candidate set,
wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input of the computational model.

* * * * *